United States Patent [19]
Beller

[11] 3,741,496
[45] June 26, 1973

[54] SAFETY SEAT BELT RETRACTOR
[75] Inventor: Herbert R. Beller, Mount Clemens, Mich.
[73] Assignee: Allied Chemical Corporation, New York, N.Y.
[22] Filed: July 13, 1971
[21] Appl. No.: 162,073

[52] U.S. Cl. .......................................... 242/107.4
[51] Int. Cl. .......................................... A62b 35/00
[58] Field of Search ................... 242/107 SB, 107.4, 242/107.5, 107.6, 107.7; 297/388, 389; 280/150 SB; 244/122

[56] References Cited
UNITED STATES PATENTS
3,632,056  1/1972  Hibbard .......................... 242/107.4
3,446,454  5/1969  Kovacs et al. .................... 242/107.4
3,598,336  8/1971  Frost .............................. 242/107.4
2,845,233  7/1958  Pfannkuch et al. ............... 242/107.4

Primary Examiner—Werner H. Schroeder
Attorney—Jonathan Plaut et al.

[57] ABSTRACT

A reel-type retractor for a safety belt incorporating an improved automatic locking device. The retractor is designed so that a driving member rotating in accordance with the reel, cooperates with a driven member to actuate a locking device, thus preventing further extension of the belt when the acceleration of the reel exceeds a preselected rate.

17 Claims, 5 Drawing Figures

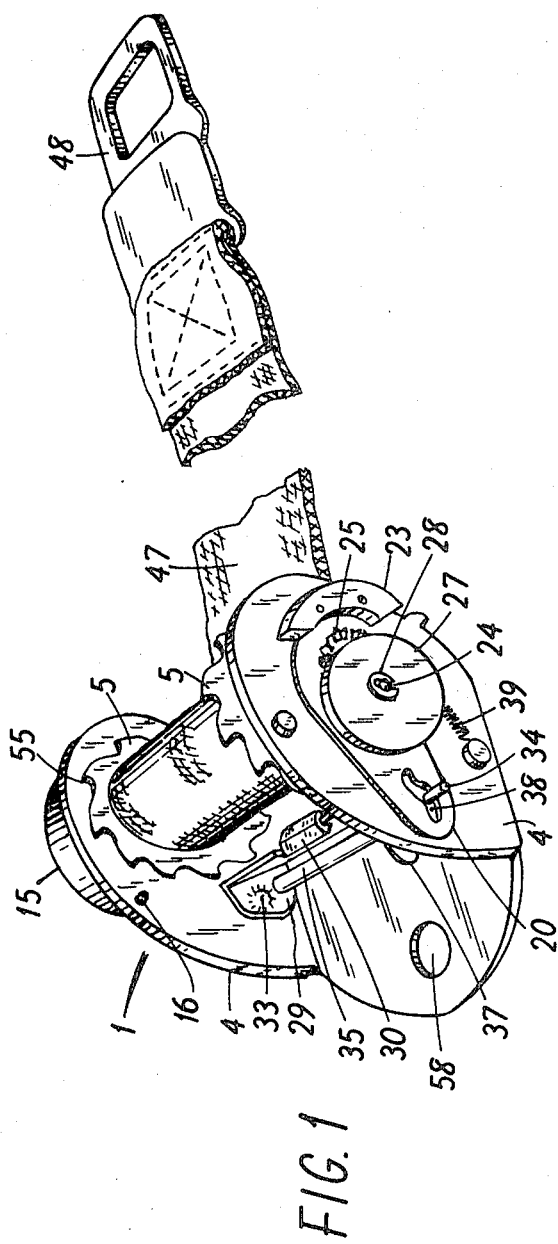
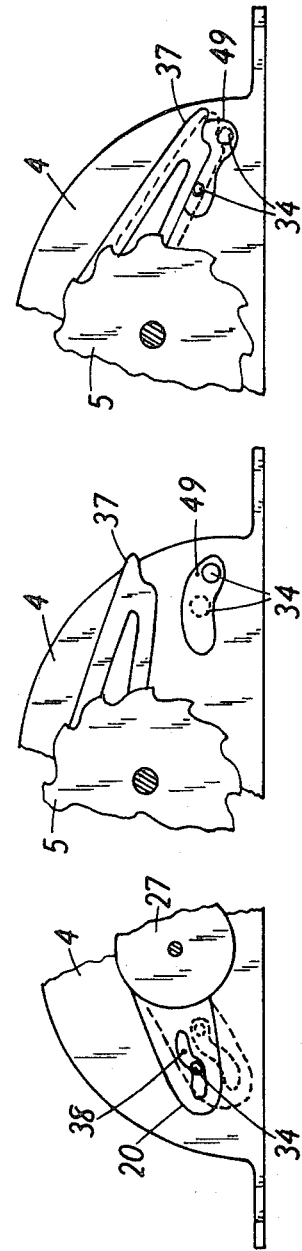

SAFETY SEAT BELT RETRACTOR

I. Field of the Invention

This invention relates to safety belt retractors, and more particularly to those retractors which are normally unlocked when the belt is extended and buckled about the user but automatically lock in response to the forces which develop during the moment of impact should a collision occur.

II. Description of the Prior Art

Emergency-locking seat belt retractors usually have a reel which is connected to the belt for retraction. In these retractors of the prior art, the reel is normally unlocked under ordinary driving conditions even though the belt is buckled about the user, thus paying out more belt or taking up the slack in accordance with the normal movements of the individual. A locking device is provided, responsive to the forces which develop at the moment of impact, thus preventing further extension of the belt and retaining the user in his or her seat.

The state of the art in this type of retraction device is exemplified by reference to U.S. Pat. Nos. 3,341,250; 3,348,789; 3,412,952; 3,446,454; 3,450,368; 3,467,337; and 3,482,799.

Many of these prior art devices are unduly complex, are not fail-safe in construction and are not positive acting, incorporating parts which may fail with wear or in the event that a lubricant should inadvertently reach their friction surfaces.

SUMMARY OF THE INVENTION

An automatic seat belt retracting device is disclosed having a locking member which is biased in a locking position, but is normally held in an unlocked position by a cam. This cam is biased to retain the locking member in its unlocked position under those conditions when the retracting reel is fully retracted or when the belt is extended at a substantially uniform rate or at a low rate of acceleration. When the reel is turned at a rapidly accelerated rate even for a matter of milliseconds, however, such as would occur when the user moves against the belt under crash conditions, a driven rotating member acting through the cam actuates the lock bar into locking engagment with the reel, thus preventing further extension of the belt. This is positive, fail-safe action and no friction surfaces are involved at this point of criticality. As an added feature to prevent the possible annoyance of the belt locking while being extended during the buckling operation, a slip clutch is included in the retractor connecting the belt wind-up reel and the locking device. This clutch retains the locking member in the unlocked position under all circumstances where the amount of belt withdrawn drawn is insufficient for buckling and also during periods of continuous extension of the belt as occurs during the process of "buckling up."

Objects and attendant advantages of the present invention will be readily appreciated as the same becomes better understood by reference to the following detailed description when considered in connection with the accompanying drawings.

DESCRIPTION OF THE DRAWINGS

The description refers to the accompanying drawings in which like reference characters refer to like parts throughout the several views:

FIG. 1 is a perspective view of an automatic locking retractor illustrating the preferred embodiment of the invention showing the belt partially wound on the reel. A cover or housing for the reel structure including an opening to guide the belt onto the reel is not shown.

FIG. 3 is a cut-away side view in elevation showing in continuous line, the relationship between the cam in the cam plate and the cam follower. In this illustration the cam is retaining the lock bar, which is attached to the cam follower, in its unlocked position. Also shown, in phantom, is the relationship between the cam and the cam follower when the locking bar (not shown) is in locking engagement with the reel.

FIG. 4 is a cut-away side view in elevation representing the inner surface of the support wall. Here the relationship is shown between the extended arm of the clutch disc and the cam follower when the locking bar (not shown) is in unlocked position, and most of the belting (not shown) is on the reel. Also shown, in phantom, is the position of the cam follower while the lock bar is still in the unlocked position, and a considerable amount of belt has been withdrawn from the reel.

FIG. 5 is a cut-away side view in elevation of a portion of the retractor drawn from the same viewpoint as that of FIG. 4. Here the extended arm of the clutch plate is shown in sliding contact with the cam follower when the latch bar (not shown) has been urged into locking engagement with the ratchet due to a sudden increase in the rate of rotation of the reel. Also shown, in phantom, is the relationship between the cam and extended arm of the clutch when belting is being withdrawn from the reel and the roll of belting on the reel is still substantially large.

Figure 2:
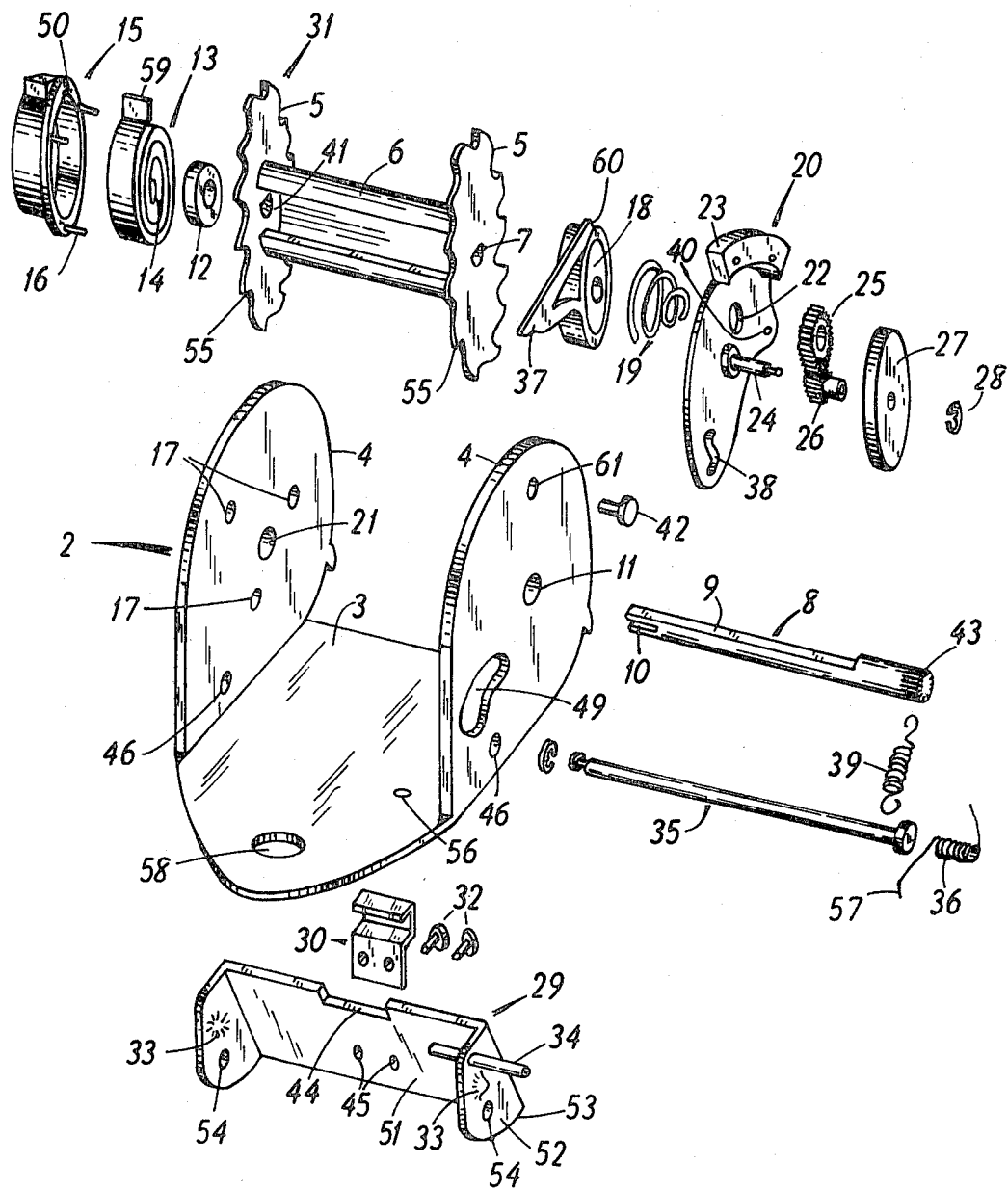
FIG. 2 is an exploded view of the preferred retractor of FIG. 1. The seat belt is not included.

Referring now the preferred retractor assembly of FIG. 1 and particularly to the exploded view of FIG. 2; circular toothed gear 25 is fixedly attached to reel shaft 8 at its milled end 43. This gear may be pressed on, it may be keyed to the shaft or it may be an integral part of said shaft. Cam plate 20 is now slipped over the other end of the shaft, said shaft extending through opening 22 so that the cam plate is rotatable in respect to the shaft. To continue with the assembly, end 10 of shaft 8 is now inserted into opening 11 of support structure 2 so as to be rotatable. Coiled spring 19 is now placed over the end of shaft 8 which is extending into the space between the walls of support 2. Next, clutch plate 18 is slipped over the end of the shaft and is rotatable with respect to it. Whereas the other elements so far discussed are generally fabricated of metal, this clutch plate is preferably fabricated from a light plastic material, such as nylon. End 10 of shaft 8 is now inserted into opening 7 of belt-reel 31 and is extended through cylindrical portion 6 until it extends through opening 41 on the opposite flange. The shaft is fixed to reel 31. In the particular embodiment shown, a flattened portion of shaft 8 keys the reel to the shaft, since openings 7 and 41 have a shape corresponding to the cross-section of the shaft. Finally, spacer 12, which also may be fabricated of a tough plastic material such as nylon, is slipped over the end of the shaft before said shaft is extended through opening 21 of support structure 2. Openings 11 and 21 are both bearings in which the shaft is journaled. The bifurcated end of shaft 8 now extends into the center of spiral ribbon spring 13 so as to firmly secure the flattened inner end 14 of the spring. The attachment of the spring to spring case 15 will be covered later.

The latch bar assembly 29 which engages ratchet faces 55 on the periphery of the flanges or reel 31 comprises lock bar 51 having a side member 52 at each end perpendicular to the bar and facing each other. Preferably, the edges 53 of these end members are also perpendicular to the surface of lock bar 51. In the embodiment here illustrated, two outwardly raised projections 33 have been embossed into the side members, said projections serving to space the latch bar between the side walls 4 of support structure 2 when said latch bar is installed between them. As shown, cam follower 34 extends outwardly from end member 52 of the latch bar. Sensing shoe 30 is positioned at point 44 of the latch bar and fixed in place by rivets 32 inserted through the shoe and through the latch bar at points 45. In continuing with the assembly of the retractor, the looped end of spiral spring 39 is slipped over pivot pin 35 which is then inserted into opening 46 in the parallel walls 4 of support 2. The portion of pivot pin 35, which now extends between the two support walls 4, is passed through opening 54 of the latch bar assembly 29. Care must be taken to see that cam follower 34 extends through opening 49 in the support frame and that it also slips into irregular cam 38 in cam plate 20, which may be rotated on shaft 43 until it is in proper alignment. Spiral spring 36 is now tensed, slipped over pivot pin 35, then positioned with crooked end 57 of said spring extending into opening 56 in the support bed. The pivot pin is now extended through opening 54 in the opposite side member of the lock bar, then to the opposite wall of support 2 and through opening 46. Spring clip 57 is then fitted under tension into groove 58 of pivot pin 35 to prevent its withdrawal. If spring 36 is under tension and properly placed, ratchet plate assembly 29 will now be urged into engagement with ratchet faces 55 of the seat belt reel 31. The hooked end of spring 39, the other end of which is fastened to pivot pin 35, is now extended under tension and hooked into opening 40 of the cam plate, thus biasing this member in the unlocked direction. Pinion 26 and rotating member 27 are shown as two separate parts for clarity of illustration. However, the shank end of the pinion gear is pressed or keyed into the rotating member, or is an integral part thereof, and this assembly as a unit is rotatably slipped over spindle 24, so that pinion gear 26 will mesh with, and be driven by, rotating circular toothed gear 25. Pinion 26, with attached rotating member 27, is now secured in place by spring clip 28 which is forced under tension into the groove of spindle 24.

The seat belt can now be attached to the reel, preferably by threading the belt into the slot in cylindrical portion 6 of the reel, slipping it around the shaft 8 and back out the slot, then sewing the belt into a permanent loop. The belt is now wound about the drum by rotating the drum in the direction permitted by the ratchets when in engagement with the ratchet bar. When the belt is thus fully retracted, spring 13 is put under moderate tension and flattened end 59 is firmly secured in slot 50 of spring case 15, which may, if desired, be of plastic material. Spring case 15 is now firmly attached to the outer support wall 4 of support frame 2 by inserting bosses 16 on the spring case through openings 17 in wall 4 of the support. The assembly is complete when clutch plate 18 is rotated until arm 37 touches cam follower 34 and pin 42 is pressed through opening 61 in support wall 4. In this position, its forward tip serves as a stop for the clutch plate 18 by contacting point 60 in the extended arm when the clutch plate rotates, as is the case when the belt is being retracted.

An outer case for the unit, although not shown, should be provided and the slot therein for the passage for the belt should be so placed as to serve as a guide for the belt which, upon retraction, is wound on the reel. To aid in this and reduce wear, if desired, small rollers can be placed at the top and bottom and/or sides of the opening, which may rotate with the belt on contact. Opening 58 of FIGS. 1 and 2 is used for attaching the retractor to the vehicle.

In operation, it can be seen that as the belt is first withdrawn from the reel, the ratchet assembly 29 cannot, under any circumstance, engage the ratchet faces 55 because sensing shoe 30 glides over the surface of the large roll of belt and prevents the lock bar to which it is attached from reaching the ratchet faces. As the belt is withdrawn to a greater extent, however, this particular means of keeping the ratchet bar from the ratchet faces is no longer effective. When the belt is first withdrawn, however, the pressure of clutch plate 18 against flange 5 of the reel, said pressure being produced by the effect of spiral spring 19, causes the clutch plate to rotate together with the reel flange until stopped by contact with cam follower 34, as shown in FIG. 5 in phantom. The contoured tip of 37 has trapped the cam follower and, as long as the belt is withdrawn continuously, no engagement between the lock bar and the ratchet faces on the reel is possible. Under these circumstances, the reel will not lock even if the rate of acceleration of the reel becomes very rapid, thus, if the user were to yank the belt from the retractor, it still would not lock. If now the belt is permitted to retract even a trifle, the clutch will rotate with the reel and the arm 37 attached thereto will lift away from the cam follower as shown in FIG. 4. If very little belt has been withdrawn, the sensing shoe attached to the lock bar will keep the cam follower in substantially the position shown in FIG. 4 in solid line. Thus, if extension of the belt is continued, the arm 37, being a part of the clutch plate, will move down again, trapping the cam follower, as shown in phantom in FIG. 5. If, however, enough belt has been withdrawn to enable a user to "buckle up," the sensing shoe will permit the lock bar and the cam follower to move because of spring 36 to the position shown in phantom in FIG. 4. If now the belt is extended further, arm 37 will again rotate downwardly and contact the cam follower 34, as shown in solid line in FIG. 5. It is now clear that the cam follower is no longer trapped by arm 37, but is free to slide beneath it. This action of itself will not cause the lock bar to engage the ratchet face, but it will permit the cam to do so should the proper conditions arise. FIGS. 4 and 5 present the view which can be had when looking at the extended arm of the clutch from a point between the two side walls of the support. FIG. 3, however, presents an exterior view of the cam follower in the irregular cam, as seen from a point outside of the retractor. The cam follower is no longer trapped by the end of the extended arm of the clutch plate, but it is now prevented from moving into a position of engagement with the ratchet faces by the shoulder in the irregular cam surface, since spring 39 biases the cam plate in this direction. The cam follower is not permitted to engage the lock bar, hence the cam may be said to be biased in the unlocked position.

When the seat belt is withdrawn from the reel at a uniform rate or even when it is withdrawn at a moderately accelerated rate, the angular force which develops in the cam plate is insufficient to overcome the bias of spring 39. The user can therefore withdraw the belt and "buckle up" without the annoyance of having the belt locked before fully extended. Once the belt has been buckled in place, the individual can move about with ease. If the user moves forward, the belt is extended to accommodate this motion. If the user sits back in the seat, the retractor takes up the slack. Therefore, at all times the belt applies a slight pressure but is generally unrestricting to normal movements. The seat belt retractor is now in the position shown in FIG. 1. In FIG. 3, the relationship between the cam and cam follower under these normal circumstances is illustrated, as well as the position of the cam plate. If the user's last motion was toward the back of his seat, the relationship between the extended arm of the clutch and the cam follower would be as illustrated in FIG. 4 in phantom, whereas if his last motion were away from the back of his seat, the relationship between the extended arm of the clutch plate and the cam follower would be identical with FIG. 4 except that the extended arm 37 of the clutch plate would be down and in contact with the cam follower in the position shown in phantom. If now the user's body lurches forward as he would do inadvertently should the vehicle become involved in a collision, the sudden, momentary extension of the seat belt imparts a momentary high rate of acceleration to both the belt reel and the circular toothed gear 25 which is attached thereto. The force applied to pinion gear 26 and rotating member 27 imparts a force on the rotatable cam plate in opposition to biasing spring 39, thus moving the cam plate to the position shown in phantom in FIG. 3 and permitting the cam follower and attached lock bar to move into locking engagement with the ratchet faces of the reel, thereby preventing any further extension of the seat belt and restraining the user.

An important feature of the retractor of the present invention is the fact that it can be readily modified to accommodate the different types of vehicles in which it might be used. For example, when the device is used in airplanes, it should be responsive only to comparatively high rates of acceleration, whereas when used in motor cars, a sensitivity to lower rates of acceleration is appropriate. The greater the tension on spring 39, the greater the rate of acceleration required in order to activate the locking mechanism. Increasing the ratio between the effective diameter of the driving gear, or circular toothed gear to the effective diameter of the driven gear or pinion, decreases the sensitivity to acceleration. Increasing the mass of the rotating member 27 also increases the sensitivity of the device to lower rates of acceleration.

In the embodiment illustrated, weight 23 balances the cam plate and its attachments about its point of rotation which is the reel shaft 8. Obviously if the mass 27 were increased or decreased to correspondingly increase or decrease the sensitivity of response of the mechanism to a certain anticipated rate of acceleration, the counter-balance 23 would be increased or decreased accordingly. The reason for the counter-balance is to render the device totally non-responsive to rapid deceleration of the vehicle. As shown, the device is only sensitive to the rapid acceleration of the belt as it is extended.

Another feature of the retractor design of the present invention, however, is that by eliminating the counter-balance, the device becomes sensitive to the rapid deceleration of the vehicle while still remaining sensitive to the rapid acceleration of the belt.

Still another feature of the embodiment as illustrated is the fact that it is substantially fail-safe. Unlike most seat belt retractors, the latch bar is biased toward the ratchet rather than away from it. If the cam plate biasing means should break, or if the clutch spring should break, the retractor would still lock in an emergency. Even if the latch bar spring were to break, the cam would urge the ratchet bar into engagement with the ratchet.

Still another feature of the embodiment shown is the fact that the lock bar, when in locking engagement with the ratchet, is perpendicular to the base and the forces applied against it by the ratchets are also perpendicular to the base. Since the bottom edge 53 of the end members of the lock bar are perpendicular to the face of the lock bar, the locking action is very positive and comparatively little of the force is transmitted to pivot pin 35.

DESCRIPTION OF THE PREFERRED EMBODIMENT

The preferred embodiment of the present invention comprises a support adapted to be fixedly connected to a vehicle and provided with a pair of spaced parallel walls. A spring biased reel is journaled on the walls and connected to one end of a seat belt so that as the reel is rotated in one direction, the belt is retracted into a roll and as the belt is unwound from the reel, it rotates in the opposite direction. The reel flanges have ratchet faces on their periphery designed for free motion in the direction of belt retraction, but for locking engagement with a pawl in the direction of belt extension. A pawl is mounted on the support for motion between a first position in which it is engagable with the ratchets and a second position in which it is separated from the ratchets.

The pawl is biased in the direction in which it is in locking engagement with the ratchets, but when the belt is fully retracted, or when it is extended at a substantially uniform rate or at a low rate of acceleration, it is maintained in its second position out of engagement with the ratchets by a cam member. This cam member comprises a plate pivotally arranged on the axel of the reel, said axel extending through a journal in one wall of the support, then through a bearing in the cam plate. The extended end of the axel terminates in a gear, which is an integral part of the axel, said gear serving to secure the cam plate in place at its pivot point. The cam surfaces of this cam plate are irregular, and guide a cam follower which is attached to the pawl, said cam follower comprising a shaft extending from a portion of the pawl which is parallel to the support adjacent to the cam member. This shaft extends in the direction of the support wall, passes through a substantially unrestricting slot in the support wall and engages the cam surfaces of the cam plate beyond said wall. The cam surfaces permit two positions of the pawl, but normally it is retained by biasing means to that position which keeps the pawl disengaged with respect to the ratchets.

A shaft extends outwardly from the exposed surface of the cam plate, and serves as the spindle for a pinion gear, rotatably positioned thereon, so that said pinion meshes with the gear which terminates the extended axel of the reel. A relatively heavy mass such as a disc or wheel is keyed to, or is an integral part of the pinion, the pinion and body comprising an assembly rotatably positioned on the aforementioned spindle. The cam plate is part of a cam plate assembly comprising said cam plate, the pinion gear and pinion shaft, the rotatable heavy mass and the means for retaining the rotatable pinion and attached inertial body on the pinion shaft. Preferably, it also includes a counter-weight described below. This cam plate assembly is rotatable about its bearing on the extension of the take-up reel axel, being rotatable within limits imposed by the action of the cam and cam follower. The counter-weight is affixed to, or is a part of the cam plate assembly, being securely positioned on the plate to balance the cam plate assembly about the extended take-up reel axel on which it rotates, thus the axel then extends through the center of gravity of the cam plate assembly and renders it non-responsive to any force of acceleration or deceleration imparted to it by the action or motion of the vehicle to which the retractor is affixed.

When the belt is normally extended, as when buckled over a passenger's lap, the cam plate is held in its unlocked position by the biasing means, and as the gear on the reel axel turns, the enmeshed pinion and attached mass revolves in the opposite direction, preferably at a greater angular velocity than that of the driving gear. If, on the other hand, the belt starts to move at a highly accelerated rate, as would happen if a collision caused the belted passenger to lurch forward, the rotatable mass is so slow to respond, that the driving gear acts against the pinion in a direction opposite to that applied to the cam plate assembly by the biasing means and with superior force. This force, acting against the pinion which is attached thereto, causes the entire cam plate to rotate about its center of gravity within the allowable limits, and thus to move against the effect of the biasing means to its release position. The cam follower thereupon permits the biased pawl to move into locking engagement with the ratchets, thus permitting no further extension of the seat belt, and holding the passenger in his seat.

Also incorporated into the preferred embodiment of the retractor device of the present invention is mechanism which prevents the locking engagement of the pawl with the ratchet under certain circumstances, even when the belt is extended at a high rate of acceleration. These circumstances are those wherein the belt has been extended a selected distance, insufficient to permit buckling, and wherein the belt is withdrawn continuously from the retractor without permitting an appreciable degree of retraction. The purpose of this mechanism is to permit the user to withdraw the belt, even vigorously if so inclined, without causing momentary engagement of the pawl and ratchets. Briefly, this additional mechanism involves the use of a slip clutch connecting the belt wind-up reel and the locking mechanism.

To accomplish this, one of the two ratchets functions as a driving clutch plate and is in frictional engagement with a corresponding biased driven clutch plate on the axel common to the reel, and disposed between the driving clutch plate and its adjacent wall. A spring between the wall and the driven clutch plate urges it toward the driving clutch plate so that as the reel is rotated, the driven clutch plate can be frictionally rotated through a limited angle of rotation between two positions.

This driven clutch plate is of a light weight material such as nylon to increase responsiveness to the action of the driving clutch plate. An arm extends from the driven clutch plate, of such length that when the belt is being withdrawn, and the driven clutch plate to which it is attached turns correspondingly within set limits, the arm comes in contact with a portion of the shaft comprising the cam follower. Alternatively, when the belt is retracted, the driven clutch plate, still following the driving clutch plate which is also a ratchet, turns correspondingly, and lifts the arm out of contact with the shaft of the cam follower.

The pawl assembly comprises a movable member which as a single unit spans the take-up reel to thus serve as a pawl for both ratchets. It has at a point between the ratchets, a shoe which slides over the surface of the bolt roll as it is extended or retracted. The roll is reduced in diameter as the belt is extended. The biased pawl moves in accordance with the changing diameter of the roll, with the shoe acting as the sensing element. The motion of the pawl, however, is normally arrested by the limiting action of the cam, before it is urged all the way into locking engagement with the ratchets. Its biased motion as the belt is unrolled from the reel, is also arrested by the arm of the driven clutch plate in the following manner:

When the extension of the belt is first begun, and the roll of belting remaining on the reel has a relatively large diameter, the shoe of the pawl in contact with the roll of belting, keeps the cam follower attached to the pawl at a point in the cam surface of substantially maximum distance from the axel of the reel. The motion of the reel causes the driven clutch plate with attached arm to move in accordance with the reel until said arm contacts the shaft of the cam follower as previously explained. The end of this arm is contoured, with the upper portion extending over the shaft of the cam follower. The lower portion is contoured to substantially fit against the aforesaid shaft so as to trap it as it moves forward as the belt extends, and the shoe or sensing element of the pawl follows the diminishing radius of the roll. As long as the belt is stationary, or is extended, this arm continues to trap the cam follower thus restraining the pawl against its biasing means and prevents locking engagement of the pawl with the ratchets. If, while only a preselected amount of belt is extended, and the remaining roll of belting on the reel has a relatively large diameter, the belt is permitted to retract any appreciable amount, the clutch will lift and disengage the arm. On continuing with the extension under these circumstances, the arm will immediately be moved into position by the clutch to again trap the shaft of the cam follower — thus, when only a short length of belting has been extended, engagement of the pawl with the ratchets is prevented under all circumstances.

When sufficient belting is unwound to permit a passenger to "buckle up," however, the sensing shoe on the biased pawl permits the cam follower attached thereto to move forward within the limits of the cam surfaces. These surfaces still normally prevent the pawl from engaging the ratchets, but they permit sufficient movement of the pawl and attached cam follower toward the latching position so that when the belt is further extended, and the clutch activated arm is lowered in contact with the shaft of the cam follower, said shaft has moved out of reach of the contoured end of the arm. The arm merely rests on top of the shaft and can no longer trap it. Thus, if the belt extension is smartly accelerated as in a collosion, the cam moves to permit the latch bar to engage the ratchets, and the shaft of the cam follower in contact with the arm slips beneath it, without being entrapped or impeded.

The sensitivity of the retractor mechanism to the degree of acceleration to which it is to be responsive, may be adjusted toward increased sensitivity as applicable to slow moving vehicles, by increasing the mass associated with the driven pinion, by decreasing the tension on the biasing means of the cam plate, and/or by increasing the ratio of the effective diameter of the driving gear to the effective diameter of the driven gear. Normally this ratio would fall within the range of 1.5:1 to 10:1, with a ratio of about 2:1 being especially preferred for automotive seat belt retractors. Obviously, the sensitivity can be reduced as would be appropriate for airplane seat belt retractors by making one or more, or all of these modifications in the opposite direction.

The retractor of our invention is positive acting since it does not depend on friction surfaces at the point of criticality. It is substantially fail-safe in design, simple to manufacture, and easily adjusted or modified for the desired sensitivity of response.

The invention has been described in an illustrative manner. It is to be understood that the terminology which has been used is intended to be in the nature of words of description rather than of limitation.

Many modifications or variations of the present invention are possible in the light of the above teachings. It is therefore to be understood that within the scope of the appended claims, the invention may be practiced otherwise than as specifically described.

I claim:
1. In a safety seat belt system, the combination comprising:
   a. a support having a base and two walls extending therefrom;
   b. a sahft journaled on the support;
   c. a reel adapted for connection to a seat belt, said reel being fixed concentrically to the shaft for rotation in a winding direction and in the opposite, unwind direction;
   d. a biasing member connected to the reel urging it to rotate in its winding direction;
   e. a locking member mounted pivotally on the support so as to be movable between a locking position in which it is operable to stop rotation of the reel in its unwind direction, and a release position in which it is inoperable to stop reel rotation;
   f. biasing means urging the locking member into locking engagement with the reel, said locking member being actuated between the unlocked position and the locked position by a movable cam;
   g. a cam plate including the cam, said cam plate being pivotally positioned on an extension of the journaled shaft, and movable between a first position and baised to this position wherein it acts on a cam follower attached to the locking member to restrain it in its unlocked position, and a second position, against its bias, to release the cam follower and the locking member attached thereto, for locking engagement with the reel;
   h. a driving rotating member fixedly positioned at the end of said shaft;
   i. A driven rotating member positioned on a spindle fixedly extending perpendicularly from the surface of the cam plate, said driven rotating member being positioned to rotate in accordance with the rotation of the driving rotating member, whereby in response to the reel being rotated in the unwind direction with an acceleration exceeding a predetermined rate, an angular displacement of the cam plate to which the driven rotating member is attached, is effected; and accordingly, a shift of the cam, thus actuating the locking member into locking engagement with the reel.

2. The combination of claim 1 wherein the driving rotating member is a circular toothed gear, and the driven rotating member is a pinion gear engaged therewith for cooperative rotation.

3. The combination of claim 2 wherein the ratio of the effective diameter of the driving gear to that of the driven pinion gear lies within the range of 1.5:1 and 10.0:1.

4. The combination of claim 1 wherein the driven rotating member comprises a rotatable pinion gear concentrically and contiguously fixed to a mass balanced about the axis of rotation of said pinion gear.

5. The combination of claim 1 wherein the cam plate is pivoted on the reel shaft at the center of gravity of the cam plate as it is constituted with all its attachements, thereby making it insensitive to forces of acceleration or deceleration induced by the vehicle to which it is attached.

6. The combination of claim 1 in which the reel comprises a cylindrical drum having a length at least as great as the width of the belt to be wound thereon, a "C" cross section, and having parallel concentric guide flanges, one at each end of the drum, provided with peripheral ratchet faces.

7. The combination of claim 1 in which the locking member comprises a locking bar positioned to simultaneously engage corresponding ratchet faces on each flange of the reel, said locking member having attached thereto a cam follower extending through an unrestricting opening in the support wall and engaging the cam of the cam plate.

8. The combination of claim 1 in which a sensing shoe extends from and is attached to the lock bar with the end of the shoe in contact with the seat belt wound on the reel, whereby when the belt is fully retracted, the position of the shoe against the belt wound on the reel keeps the lock bar out of engagement with the reel in opposition to the biasing means, but when the belt wound on the reel diminishes with extension of the belt, the lock bar is urged toward the reel.

9. The combination of claim 8 wherein the cam comprise two smoothly connected slots in the cam plate, allowing motion of the cam follower in accordance with the movement of the locking bar.

10. The combination of claim 5 in which a weight is added to a point on the cam plate of sufficient mass to insure that the pivot point coincides with the center of mass of the cam plate assembly.

11. The combination of claim 1 wherein the center of mass of the cam plate assembly is positioned beneath the pivot point when the retractor is to be mounted in a vehicle which travels in the direction in which the belt extends from the reel.

12. The combination of claim 1 wherein the center of mass of the cam plate assembly is positioned above the pivot point when the retractor is to be mounted in a vehicle which normally travels in a direction opposite to that in which the belt extends from the reel.

13. The combination of claim 8 in which a clutch plate is rotatably positioned on the reel shaft between a support wall and biased into frictional engagement with the reel flange, said clutch plate having an extending arm and said clutch plate being movable to a first position and a second position by the unwind rotation of the contiguous reel flange wherein in the first position the extending arm traps and restrains the latching member when the sensing shoe is in contact with the belt, a second position when the sensing shoe is not in contact with the belt wherein the extending arm contacts but does not trap or restrain the latching member, said clutch plate having a third position to which it is moved by the wind rotation of the contiguous reel flange wherein the extending arm is out of contact with the latching member.

14. The combination of claim 13 wherein the clutch plate with attached arm is in frictional contact with the reel, whereby it rotates as the belt is extended, said rotation being terminated by contact of the arm with the cam follower, and similarly, when the belt is retracted, the clutch rotates with the reel until the arm contacts a pin extending from the adjacent support wall.

15. The combination of claim 13 wherein the end of the extended arm of the clutch contacts an extension of the cam follower at a point between the body of the lock bar, and the support wall adjacent to the cam plate.

16. The combination of claim 15 wherein the end of the extended arm of the clutch plate is indented to trap the cam follower when contact is made while the lock bar is positioned by the sensing shoe in accordance with a substantially full roll of belting on the reel, said entrapment being maintained while the belt is extended but terminated by an appreciable degree of retraction.

17. In a safety seat belt system, the combination comprising:
  a. a support having a base and two walls extending therefrom;
  b. a reel adapted for connection to a seat belt, said reel comprising a cylindrical drum having a length at least as great as the width of the belt to be wound thereon, a "C" cross section, and parallel concentric guide flanges, one at each end of the drum, provided with peripheral ratchet faces, the reel being fixed concentrically on a shaft journaled into a pair of openings in the support wall for rotation in a winding direction and in the opposite, unwinding direction;
  c. a biasing member connected to the shaft to urge the reel assembly to rotate in its winding direction;
  d. a locking bar mounted on the support, and movable between a locking position in which it simultaneously engages corresponding ratchet faces on the flanges to stop rotation of the reel in its unwind direction, and a release position in which it is inoperable to stop reel rotation;
  e. biasing means urging the locking bar into locking engagement with the ratchets, said locking member having attached thereto a cam follower extending through an unrestricting opening in the support wall and engaging a cam, said locking member being actuated between the locked position and the unlocked position by said cam;
  f. a sensing shoe attached to the face of the lock bar facing the drum, whereby when the belt is fully retracted, the pressure of the shoe against the belt roll keeps the lock bar out of engagement with the ratchets in opposition to the biasing means, but when the belt roll diminishes with the extension of the belt, the lock bar is urged toward the ratchets;
  g. a clutch plate rotatably positioned on the reel shaft between a support wall and a reel flange, with biasing means urging the clutch plate into frictional engagement with the reel flagne, said clutch plate having an arm extending for touching engagement with a section of the cam follower, the end of said arm being so contoured as to restrain the latch bar against engagement with the ratchets if the contact is made while the lock bar is positioned by the relationship between its sensing shoe and a substantially full belt roll, but so as not to restrain the lock bar if the contact is made while the lock bar is positioned by the relationship between its sensing shoe and a relatively small belt roll;
  h. The end of the extended arm of the clutch plate being indented to trap the cam follower when contact is made while the lock bar is positioned by the sensing shoe in accordance with a substantially full roll of belting on the reel, said entrapment being maintained while the belt is extended, but terminated by an appreciable degree of retraction;
  i. a cam plate including the cam, said cam plate being rotatably positioned on an extension of the journaled shaft so as to be parallel to the support wall, said cam plate being biased toward the unlocked position;
  j. a driving rotating circular toothed gear fixedly positioned at the end of said shaft to thus secure the cam plate rotatably between said gear and the support wall;
  k. a driven pinion rotatably positioned on a spindle fixedly extending perpendicularly from the surface of the cam plate, said driven pinion having an appreciable mass and being positioned for cooperation with the driving gear, whereby in response to the reel being rotated in an unwind direction at a constant rate, or at an accelerated rate of less than a predetermined value, the pinion will revolve in relation to the rotation of the driving gear, without causing appreciable displacement of the cam plate to which it is affixed, against the biasing means, but when the degree of acceleration exceeds a predetermined rate as fixed by the amount of bias, the mass of the pinion, and the ratio between the effective diameters of the driving and driven gear, an angular displacement of the cam plate is effected; and accordingly, a shift of the cam, thus actuating the locking bar into locking engagement with the ratchets.

* * * * *